United States Patent [19]

Murayama

[11] 4,320,424
[45] Mar. 16, 1982

[54] TAPE RECORDER HAVING CASSETTE LOADING APPARATUS

[75] Inventor: Osamu Murayama, Kanagawa, Japan

[73] Assignee: Sony Corporation, Tokyo, Japan

[21] Appl. No.: 131,836

[22] Filed: Mar. 19, 1980

[30] Foreign Application Priority Data

Mar. 22, 1979 [JP] Japan .................................. 54-33452

[51] Int. Cl.³ ...................... G11B 5/008; G11B 15/00; G11B 15/18; G06K 13/00
[52] U.S. Cl. .................................... 360/96.5; 360/71; 360/85; 360/96.6; 235/482
[58] Field of Search ...................... 360/96.5, 96.6, 71, 360/85, 137; 235/479, 283; 308/36.1; 240/197, 179

[56] References Cited

U.S. PATENT DOCUMENTS

| 3,904,149 | 9/1975 | Suzuki | 360/96.5 |
| 3,964,096 | 6/1976 | Matsuyama | 360/85 |
| 3,976,858 | 8/1976 | Haun | 235/482 |
| 4,071,859 | 1/1978 | Sami | 360/105 |
| 4,096,536 | 6/1978 | Cicatelli | 360/96.5 |
| 4,099,209 | 7/1978 | Sander | 360/96.5 |
| 4,099,213 | 7/1978 | Schatteman | 360/96.5 |
| 4,202,021 | 5/1980 | Nagase | 360/96.5 |
| 4,216,508 | 8/1980 | Hunter | 360/137 |
| 4,227,224 | 10/1980 | Umezawa | 360/96.5 |
| 4,227,226 | 10/1980 | Tashiro | 360/71 |

Primary Examiner—Robert M. Kilgore
Attorney, Agent, or Firm—Lewis H. Eslinger; Alvin Sinderbrand

[57] ABSTRACT

A cassette loading/unloading apparatus for a tape recorder employs a motor driven pinion driving a rack for moving a cassette guided by guide members between a loading/ejection position and an operational position. A single switch senses the insertion of the cassette to begin the loading sequence and also stops the motor when the cassette reaches the operational position. In addition, the switch stops the motor at the conclusion of the ejection sequence when the cassette reaches the ejection position.

6 Claims, 14 Drawing Figures

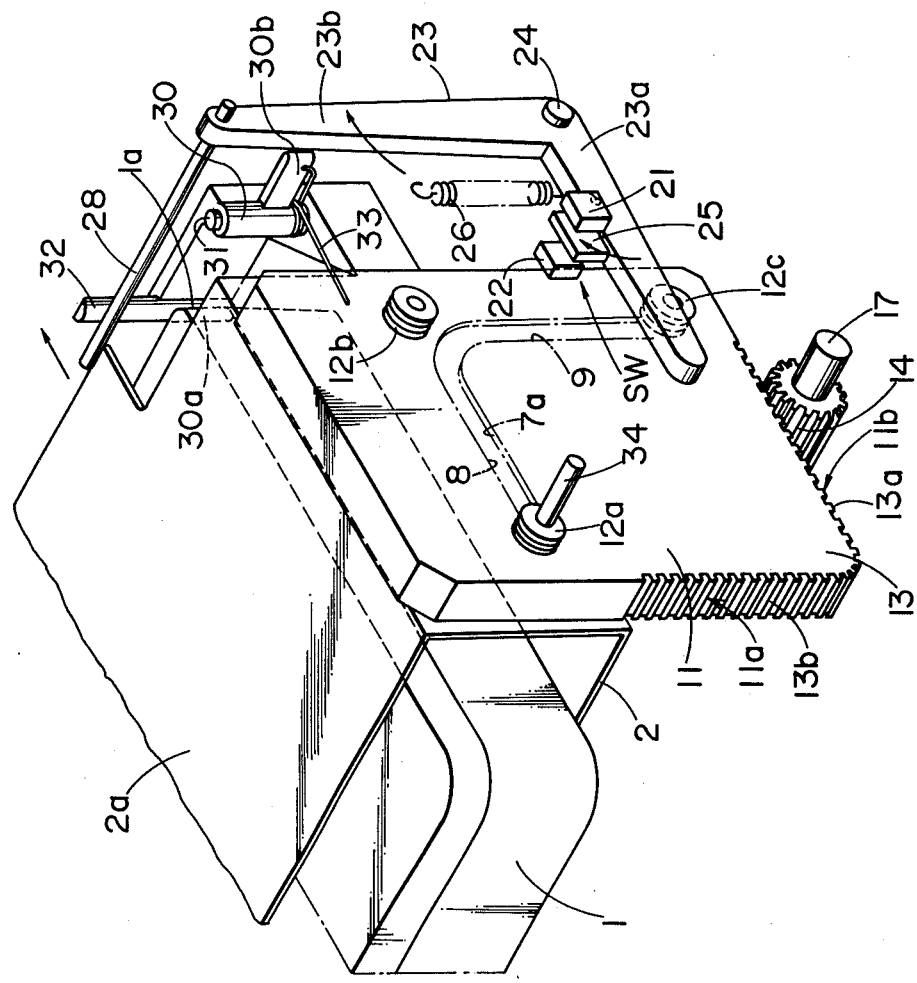

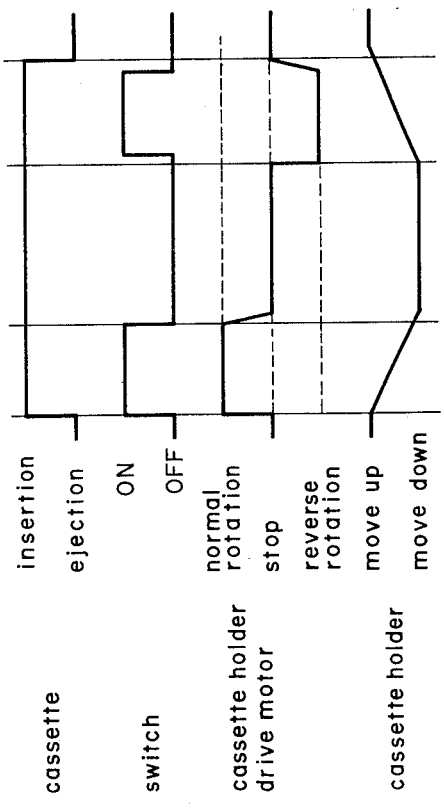

TAPE RECORDER HAVING CASSETTE LOADING APPARATUS

BACKGROUND OF THE INVENTION

This invention relates to an automatic cassette loading apparatus for a cassette tape recorder.

Most manually loaded video tape recorders have a cassette holder which moves only in the vertical direction for loading and unloading a cassette. When a cassette is loaded, it is inserted horizontally into the cassette holder which is then manually pushed downwards against a spring. When the cassette is ejected, the holder is impulsively pushed upwards by the spring. Two operations are required for cassette loading. First, the cassette is horizontally inserted into the holder, and then the cassette holder containing the cassette is pushed downward into the operational position. Such cassette loading must be performed from above and cannot be used in a front operated video tape recorder which does not afford access to the cassette holder from above. Further, the strong spring needed for returning the holder upwardly when ejecting a cassette produces an objectionable mechanical shock upon ejection.

Electrically operated cassette loading apparatus using an electrical motor to load and eject a cassette solves some of the problems of manual loading but usually requires three control switches. A first control switch detects the insertion of a cassette into the cassette holder to begin rotation of the electric motor. A second control switch is a limit switch which stops the electric motor when the cassette reaches its operative position. A third switch detects the completion of ejection of the cassette and the return of the cassette holder to the cassette insertion position to stop the electric motor. The large number of control switches increases the cost and complexity of such a loading and unloading apparatus.

OBJECTS AND SUMMARY OF THE INVENTION

Accordingly, it is an object of this invention to provide a tape recorder having a cassette loading apparatus whic overcomes the above defects.

Another object of this invention is to provide a tape recorder having a cassette loading apparatus in which a cassette holder is quietly and smoothly moved between a cassette insertion position and a cassette operating position.

A further object of this invention is to provide a tape recorder having a cassette loading apparatus which is suitable for front operation.

A still further object of this invention is to provide a tape recorder having a cassette loading apparatus which is easier to operate.

A still further object of this invention is to provide a tape recorder having a cassette loading apparatus operable by an electric motor and in which insertion of the cassette into the cassette holder, cassette loading and return of the cassette to the cassette ejecting position are all detected and/or controlled by a single switch.

According to an aspect of the invention, a cassette loading apparatus for a tape recorder comprises cassette holding means, means for guiding the cassette holding means between a cassette insertion/ejection position and an operative position in a guiding path consisting of a first path portion extending in a first direction and a second path portion extending in a second direction, drive means for moving the cassette holding means between the cassette insertion and operative positions along the guiding path, and electrical means for powering said drive means.

According to a feature of the invention, the cassette loading apparatus is provided for a front-loading video tape recorder with the cassette holding means being effective to accept the cassette inserted from a front of the video tape recorder when in the insertion/ejection position, and the drive means includes a rack extending parallel to the guiding path and a pinion meshing with the rack and being reversibly driven by an electric motor, with one of the rack and pinion being mounted on the cassette holding means, and the other of said rack and pinion being fixedly supported.

In accordance with another feature of the invention, a cassette loading apparatus, as aforesaid, is provided with a control switch having first and second conditions, means responsive to insertion of the cassette into the cassette holding means for actuating the control switch to the first condition whereby cassette loading is initiated, and means responsive to arrival of the cassette holding means at the operative position for actuating the control switch to the second condition whereby cassette loading is terminated.

The above, and other objects, features and advantages of the present invention, will become apparent from the following description, read in conjunction with the accompanying drawings, in which like reference numerals designate the same elements.

BRIEF DESCRIPTION OF THE DRAWINGS

FIGS. 4A–4D are fragmentary perspective views of the cassette loading apparatus to which reference will be made in explaining the sequence of cassette loading and unloading operations and switch actuations; and FIGS. 5A–5D are graphs to which reference will be made in explaining the sequence of cassette loading and unloading operations and the switch actuations.

DETAILED DESCRIPTION OF THE PREFERRED EMBODIMENT

Figure 1A:
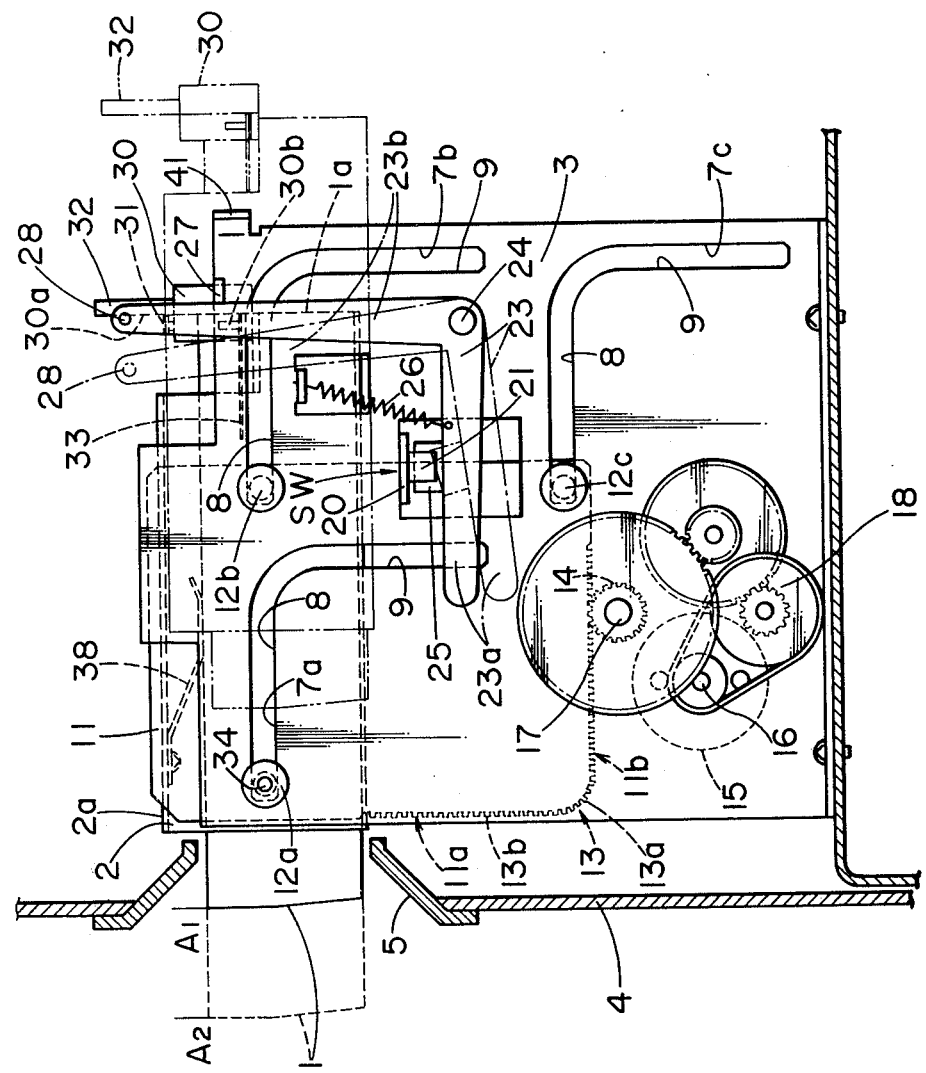
FIG. 1A is a side view of a cassette loading apparatus according to one embodiment of this invention, with a cassette holder thereof being shown in an upper or loading/unloading position.
Figure 2A:
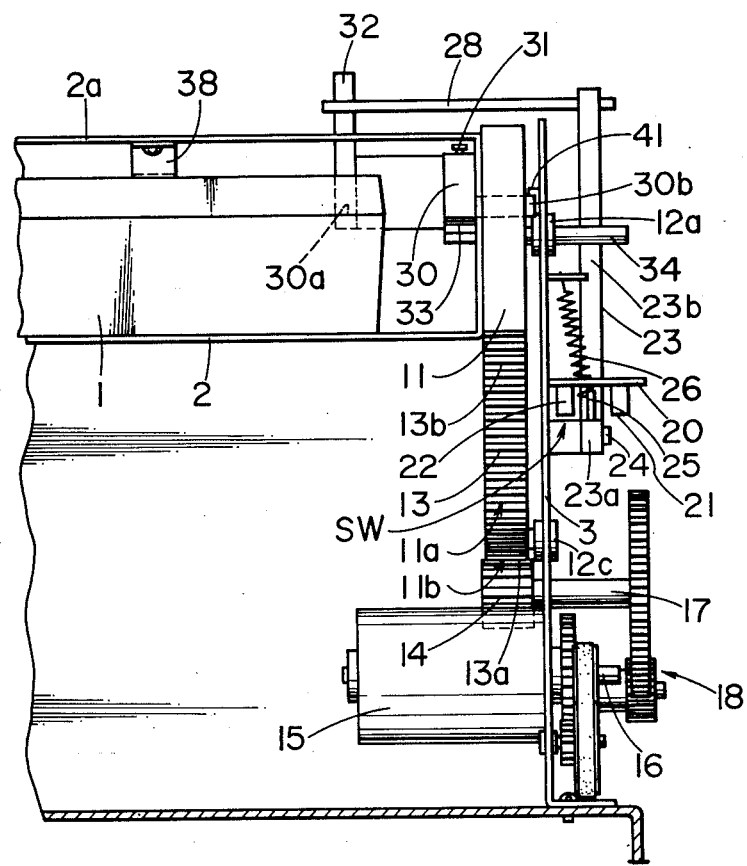
FIG. 2A is a fragmentary front view of a portion of the cassette loading apparatus of FIG. 1A, and in which the cassette holder is shown in the upper or loading/unloading position.
Figure 2B:
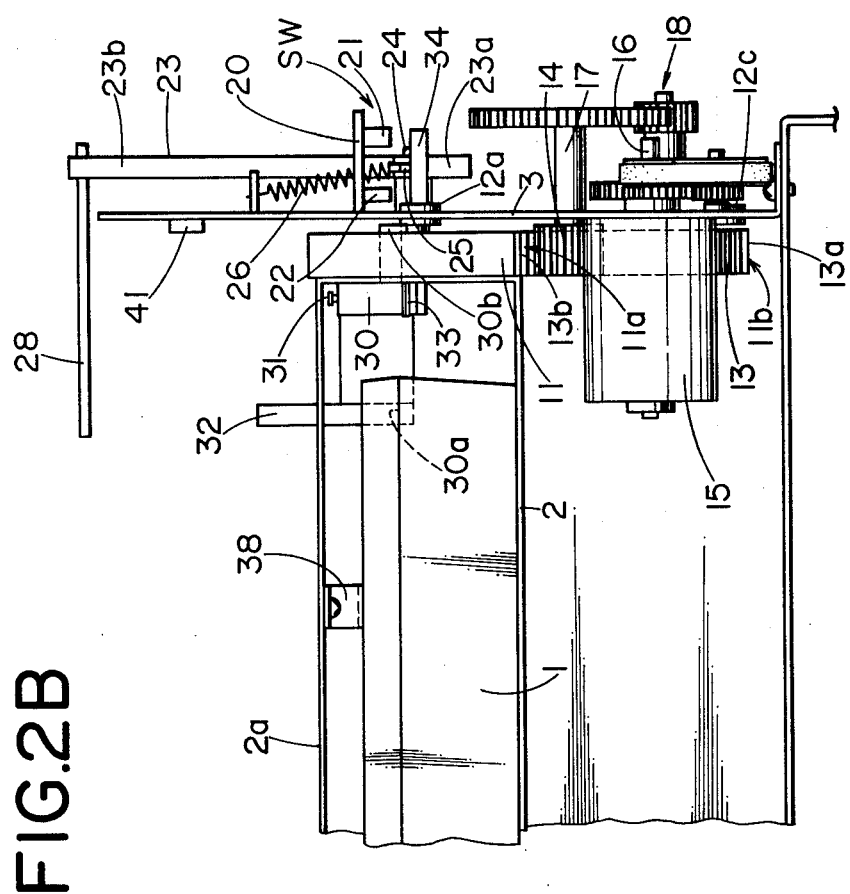
FIG. 2B is a fragmentary front view similar to that of FIG. 2A, but in which the cassette holder is shown in the lower or operational position.
Figure 3A:
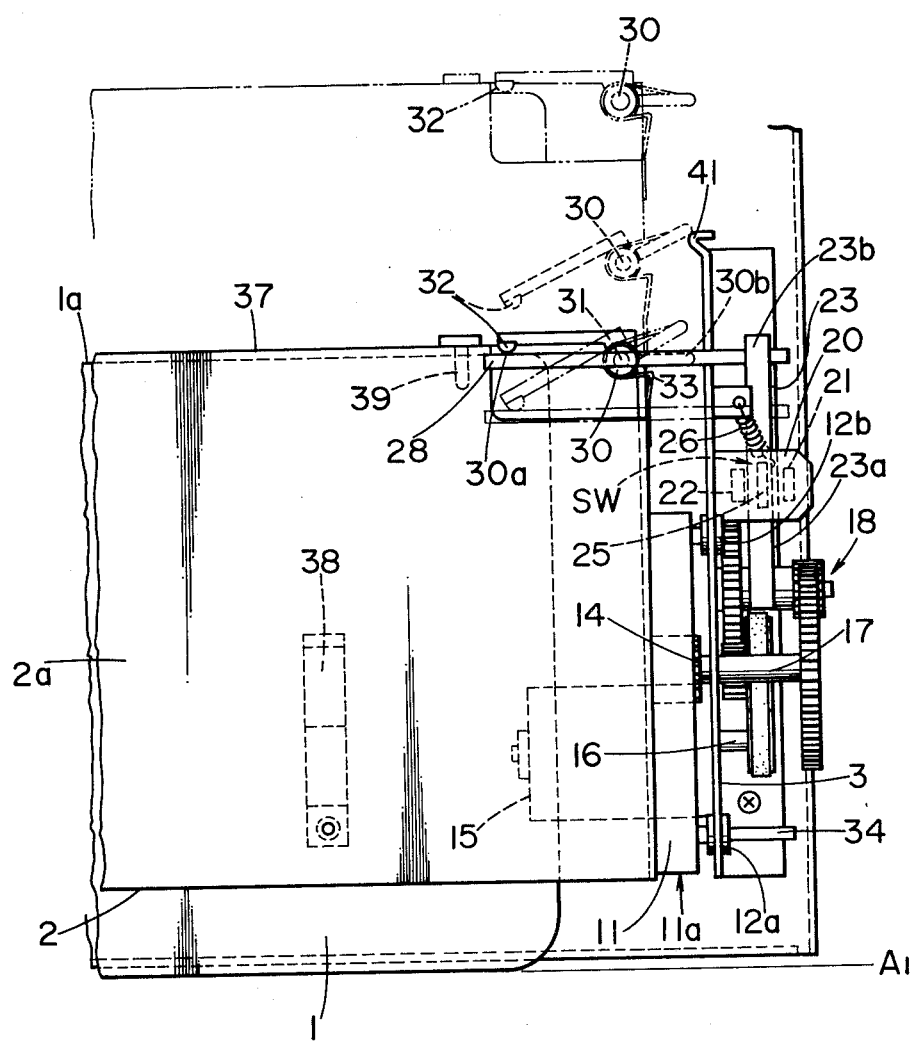
FIG. 3A is a fragmentary plan view of a portion of the cassette loading apparatus of FIG. 1A with the cassette holder being shown in the upper or loading/unloading position.
Figure 3B:
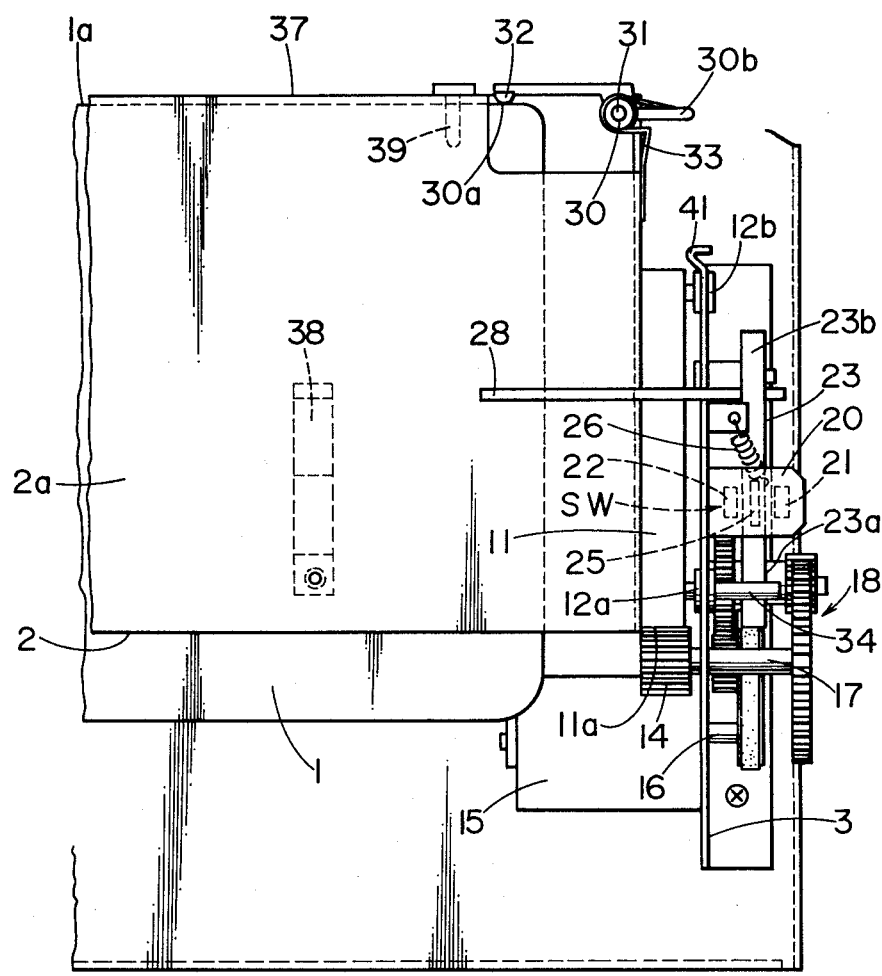
FIG. 3B is a plan view similar to that of FIG. 3A, but with the cassette holder being shown in the lower or operational position.

Referring to FIGS. 1A, 2A and 3A, a cassette holder 2 is there shown supported between a pair of vertical support plates 3. A cassette 1 may be inserted horizontally into the cassette holder 2 through a cassette insertion/ejection opening 5 in a front panel 4.

Except as described later, the arrangements at both sides of the cassette holder 2 are the same and only the structures at one side are shown and described in detail. Three parallel inverted L-shaped slots or guide openings 7a, 7b and 7c are spaced apart in each support plate 3. Each guide opening 7a, 7b and 7c consists of a horizontal part 8 and a vertical part 9 contiguous with the horizontal part 8. Vertical plates 11 are fixed on the side walls of cassette holder 2. Three guide rollers 12a, 12b and 12c are rotatably mounted on each of vertical plates 11, and are fitted into guide openings 7a, 7b and 7c in the adjacent support plate 3 so as to be rollable therein. Thus, each side of cassette holder 2 is supported by the respective three guide rollers 12a, 12b and 12c on the adjacent support plate 3.

A rack 13 is formed on the edge of each vertical plate 11. Rack 13 consists of a front vertical part 11a and a bottom horizontal part 11b contiguous to the lower end of front vertical part 11a. A pinion 14 is engaged with each rack 13 and is mounted on a pinion shaft 17 rotatably supported by support plates 3. Pinion shaft 17 is interconnected through a reduction gear mechanism 18 to a motor shaft 16 of a reversible electric motor 15 fixed on one of the support plates 3. Each pinion 14 can be rotated in the forward and reverse directions by electric motor 15.

A switch device SW for detecting the presence of cassette 1 inserted into cassette holder 2 and for controlling the rotation of electric motor 15 is mounted on one of the support plates 3. In the illustrated embodiment, switch device SW includes a photoelectrical conversion element consisting of a light emitting diode 21 and a photo transistor 22 fixedly spaced from each other on a switch support plate 20 which is, in turn, mounted on one of the support plates 3. When light from light emitting diode 21 enters photo transistor 22, switch device SW is turned OFF. When light from light emitting diode 21 is intercepted by an object, such as a shutter 25, interposed between light emitting diode 21 and photo transistor 22, switch device SW is turned ON. Alternatively, a mechanical switch may be substituted for the described switch device SW.

A substantially L-shaped switch operating lever 23, having a substantially horizontal arm 23a and a substantially vertical arm 23b, is rotatably supported on a horizontal support pin 24 affixed to the support plate 3 on which switch device SW is mounted. Shutter 25 for switch device SW is mounted on horizontal arm 23a. Switch operating lever 23 is urged in the clockwise direction (FIG. 1A) by a tension spring 26. As shown by the solid line in FIG. 1A, the clockwise rotation of switch operating lever 23 is restricted by contact of vertical arm 23b with a stop 27 fixed on support plate 3. A long pin 28 (FIGS. 2A and 3A) extends horizontally from the upper end of vertical arm 123b.

A cassette ejecting lever 30 is rotatably supported on a vertical support pin 31 at a rear corner of cassette holder 2 which is adjacent the support plate 3 having lever 23 thereon. One end 30a of cassette ejecting lever 30 is engageable by a front surface 1a of cassette 1 when the latter is inserted into cassette holder 2. An upward projection 32 extends from end 30a of cassette ejecting lever 30. Cassette ejecting lever 30 is normally urged in the counter-clockwise direction (FIG. 3A) by a torsion spring 33. Upward projection 32 makes intersecting contact with long pin 28 under the influence of the spring force of torsion spring 33 which exceeds the spring force of tension spring 26. Switch operating lever 23 is normally urged in the counter-clockwise direction shown by the arrow in FIG. 4A by the action of cassette ejecting lever 30. A roller shaft 34 of guide roller 12a extends laterally far enough to overhang horizontal arm 23a of switch operating lever 23.

Figure 4A:
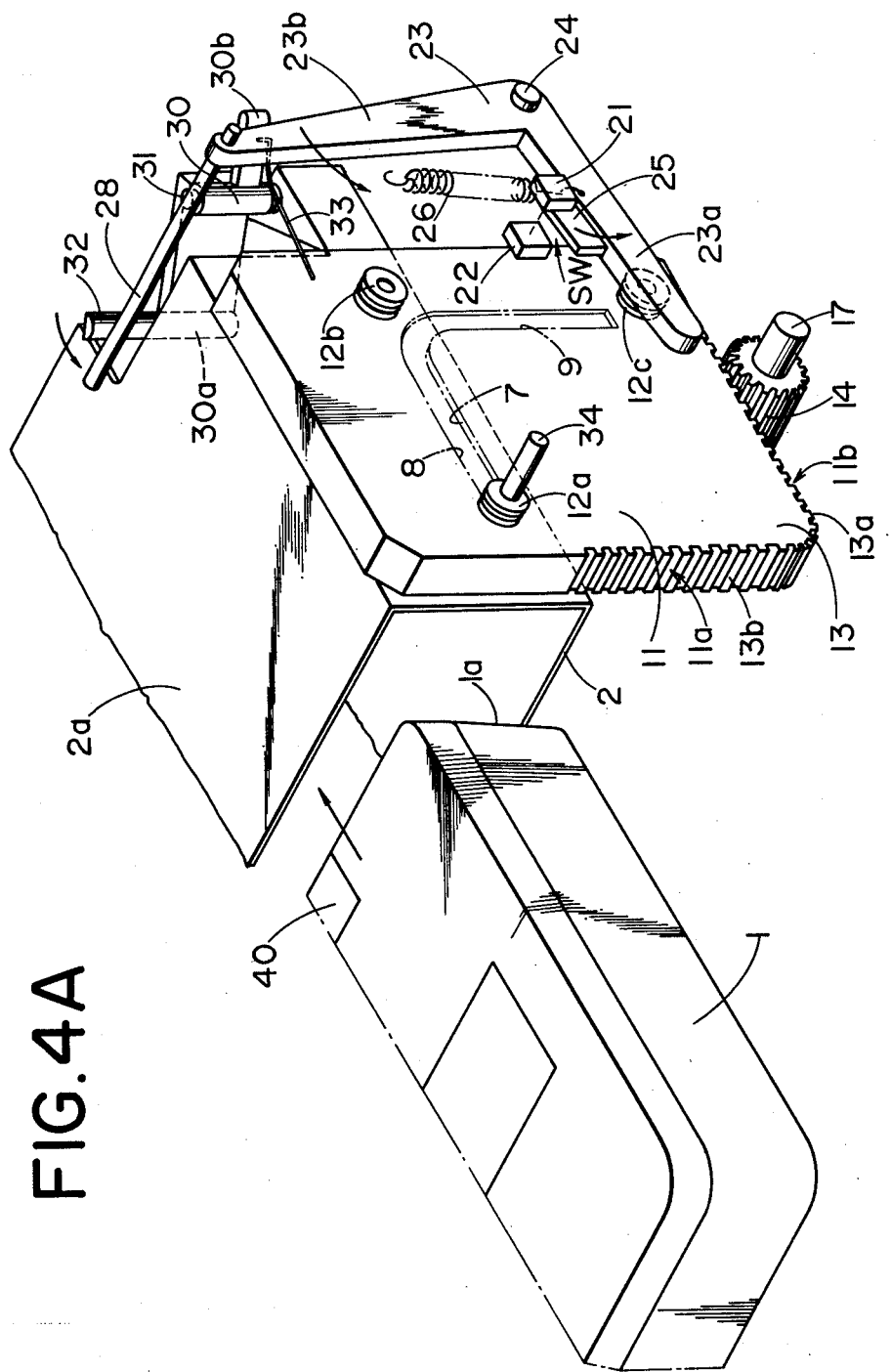

Referring now to the sequence of drawings 4A-4D and to the sequence of operations of switch device SW, drive motor 15 and cassette holder 2, shown on FIGS. 5A-5D, cassette holder 2 is initially located at the upper or loading/unloading position as shown in FIGS. 1A, 2A and 3A. As shown in FIG. 4A, cassette 1 is inserted horizontally through cassette inserting/ejection opening 5 into cassette holder 2 so that the rear or trailing end of cassette 1 is pushed to a position $A_1$ shown by the solid line in FIG. 1A and FIG. 3A. Front surface 1a of cassette 1 contacts end 30a of cassette ejecting lever 30 located at the position shown by the dot-dash line in FIG. 3A. Continued insertion of cassette 1 pushes end 30a of cassette ejecting lever 30 further rearward to thus rotate cassette ejecting lever 30 in the clockwise direction (FIG. 3A) against the urging of torsion spring 33, into the position shown in solid line in FIG. 3A. At the end of the insertion of cassette 1, front surface 1a of cassette 1 contacts a stop 37 fixed at the rear end of cassette holder 2. At the same time and as is conventional, a lock releasing pin 39 at the rear end of cassette holder 2 enters a lock aperture in the front end of cassette 1 to release a lock (not shown) for a front cover 40 of the cassette, so that cover 40 can be opened to permit the tape therein to be withdrawn in a conventional manner. Cassette 1 is pushed downward against the bottom of cassette holder 2 by a cassette clamping spring 38 which is fixed on the lower surface of upper wall 2a of cassette holder 2.

When cassette ejecting lever 30 is rotated to the position shown in solid line in FIG. 3A, the spring force of spring 33 previously applied therethrough to switch operating lever 23 is released. Switch operating lever 23 thus rotates in the clockwise direction (FIG. 1A) under the urging of tension spring 26 from the position shown in dot-dash line to the position shown in solid line. In this latter position, shutter 25 is moved between light emitting diode 21 and photo transistor 22 (FIG. 4B) of switch device SW to intercept the light previously entering photo transistor 22. This turns switch device SW ON. Motor 15 is energized by switch device SW to rotate in the forward direction, and pinion 14 is rotated in the clockwise direction (FIG. 1A).

Figure 4C:
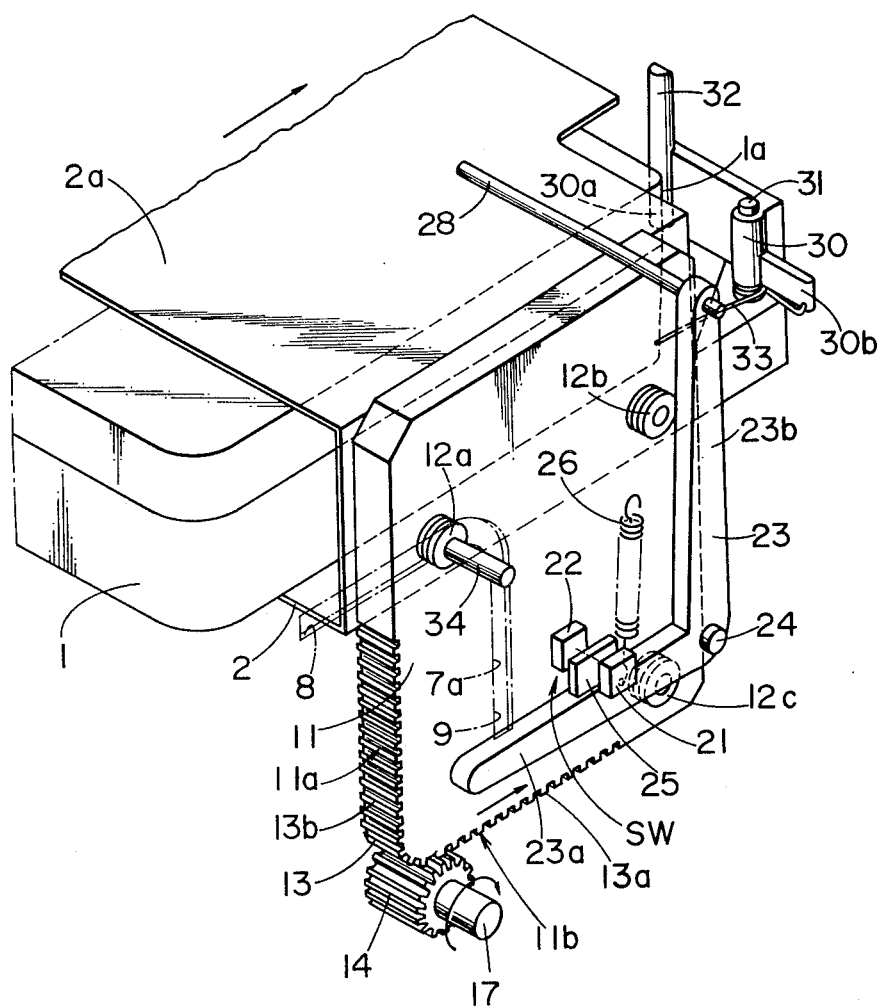
Figure 4D:
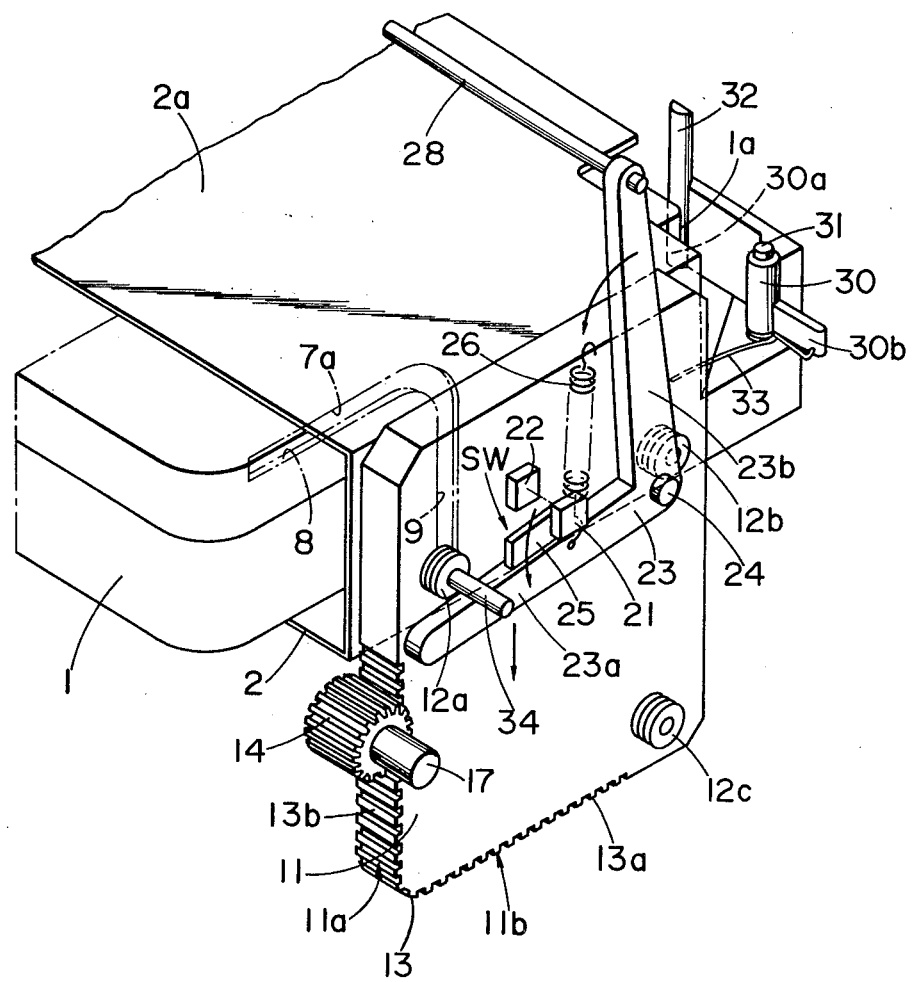

First, horizontal part 13a of rack 13 is driven by pinion 14. Guide rollers 12a, 12b and 12c follow guide openings 7a, 7b and 7c, respectively, to translate cassette holder 2 horizontally and rearwards along horizontal part 8 of guide openings 7a, 7b and 7c (FIG. 4C) to the position shown by the two dot-dash line in FIG. 1A and FIG. 3A.

As cassette holder 2 is moved horizontally backwards, a second end 30b of cassette ejecting lever 30 (FIG. 3A) contacts an inclined portion of a stop plate 41, and slides over it without affect on the loading operation.

Guide rollers 12a, 12b and 12c then reach the tops of vertical parts 9 of guide openings 7a, 7b and 7c respectively. At the same time, the lower end of vertical part 13b of the rack 13 reaches pinion 14. As vertical part 13b is driven by pinion 14, guide rollers 12a, 12b and 12c follow guide openings 7a, 7b and 7c, respectively, to guide the downward motion of cassette holder 2 to its lower or operational position shown in FIGS. 1B, 2B, 3B and 4D. In the course of such downward motion of holder 2, the unlocked lid or cover 40 is opened in a conventional manner.

Just as cassette holder 2 approaches its operational position, roller shaft 34 (FIG. 4A) contacts the top of horizontal arm 23a. Horizontal arm 23a is pushed downwards by roller shaft 34 and switch operating lever 23 is thereby rotated in the counter-clockwise direction against the urging of tension spring 26. This moves shutter 25 out of the space between light emitting diode 21 and phototransistor 22 of switch device SW. Switch device SW is turned OFF to stop the rotation of motor 15. At the end of the cassette loading cycle just described, tape loading may be performed in a well-known manner to withdraw tape through the opened cover 40 and to wrap the withdrawn tape about a guide drum (not shown) of the cassette recorder.

Before beginning the cassette unloading cycle to be described, it is assumed that a conventional tape unloading operation has been completed wherein the tape is unwrapped from the guide drum and returned to cassette 1. The tape and cassette unloading may be initiated by any conventional means such as by sensing an end of the tape or by manual operation of an ejection switch (not shown).

Figure 1B:
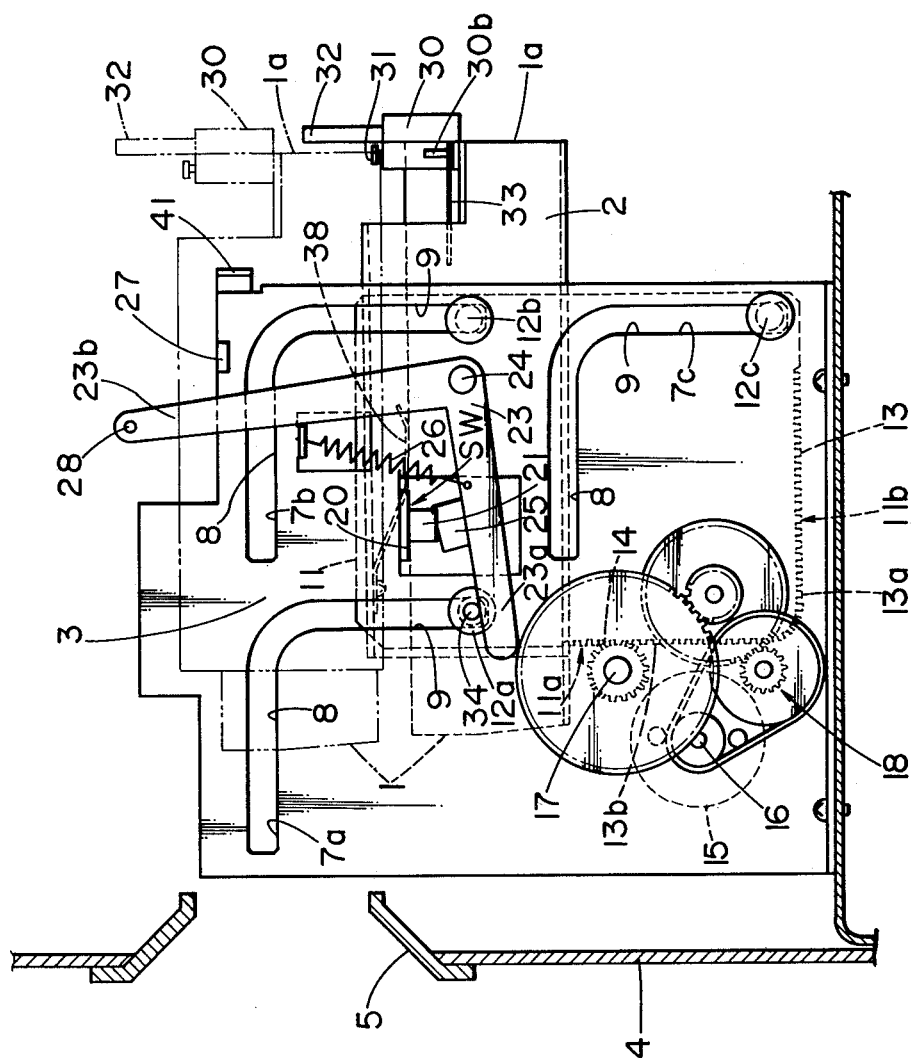
FIG. 1B is a side view similar to that of FIG. 1A, but in which the cassette holder is shown in a lower or operational position.

When cassette unloading is thus initiated, motor 15 rotates in the reverse direction. Pinion 14 is rotated in the counter-clockwise direction (FIG. 1B). Rack 13 is driven by pinion 14, to translate cassette holder 2 vertically upward, and then horizontally forward toward the upper position shown in FIGS. 1A, 2A and 3A. When cassette holder 2 begins moving vertically upward, roller shaft 34 is raised from horizontal arm 23a of switch operating lever 23. Switch operating lever 23 is rotated in the clockwise direction (FIG. 1B) bt tension spring 26. Shutter 25 is inserted into the space between light emitting diode 21 and phototransistor 22 of switch device SW so that the latter is turned ON to continue the reverse rotation of motor 15 after the release of the ejecting switch.

As guide rollers 12a, 12b and 12c are returning along horizontal portion 8 of the respective guide openings, and just before cassette holder 2 reaches its original position shown by the solid line in FIG. 1A, second end 30b of cassette ejecting lever 30 contacts stop plate 41. At that instant, cassette ejecting lever 30 (FIG. 3A) is rapidly rotated in the counter-clockwise direction as shown by the dotted line in FIG. 3A. End 30a propels cassette 1 to a position $A_2$ shown in the dotted line (FIG. 1A). Position $A_2$ is far enough out of holder 2 that cassette 1 can be easily grasped and withdrawn from cassette insertion/ejection opening 5.

Cassette ejecting lever 30 is maintained in the counter-clockwise rotational position by torsion spring 33. As cassette holder 2 is moved forward to its final position, upward projection 32 contacts long pin 28 and pushes it to the position shown in dot-dash line in FIG. 3A. Switch operating lever 23 is rotated in the counter-clockwise direction (FIG. 1A) against tension spring 26 to the position shown by the dot-dash line in FIG. 1A. Shutter 25 is withdrawn from the space between elements 21 and 22 of switch device SW which is thereby again turned OFF to stop the rotation of motor 15. This ends the cassette ejection sequence.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

For example, in the above embodiments, each rack 13 is fixed on cassette holder 2, while each pinion 14 and motor 15 are stationarily mounted on support plates 3. Alternatively, racks 13 may be stationarily fixed on support plates 3 and pinions 14 and motor 15 may be mounted to move along racks 13 with cassette holder 2.

Although the preferred embodiment employs an L-shaped rack 13 and cassette holder 2 is thereby moved in an L-shaped path, rack 13 may have any convenient shape and cassette holder 2 may be correspondingly moved in a similar path.

Further, instead of the single switch SW disclosed in the preferred embodiment, a plurality of switches may be used for detecting and limiting motion of cassette holder 2 and/or cassette 1.

In addition, slide plates or the like may be substituted for switch operating lever 23 and cassette ejecting lever 30 in the above embodiment.

What is claimed is:

1. A cassette loading apparatus for a front-loading video tape recorder comprising:

cassette support means;

holding means movable relative to said support means between an insertion and ejection position and an operative position;

said cassette holding means being adapted to accept and hold a cassette inserted therein from a front of the video tape recorder when said holding means is in said insertion and ejection position;

a rack having a horizontal portion and a vertical portion contiguous to said horizontal portion;

a pinion engaging said rack;

one of said rack and pinion being secured to said holding means;

guiding means for guiding said holding means along a substantially horizontal path portion and along a substantially vertical path portion contiguous to said horizontal path portion between said insertion and ejection position and said operative position;

said guiding means being effective to maintain meshing engagement of said pinion with said horizontal and vertical portions of the rack during movement of said holding means along said horizontal and vertical path portions, respectively;

a reversible electric motor for rotating said pinion;

motor control means having first and second conditions for controlling the operation of said electric motor;

means responsive to insertion of said cassette into said holding means for actuating said motor control means to said first condition whereby operation of said motor is effected and movement of said holding means from said insertion and ejection position to said operative position is initiated;

means responsive to arrival of said holding means at said operative position for actuating said motor control means to said second condition whereby further movement of said holding means is there terminated; and means responsive to return movement of said holding means from said operative position to said insertion and ejection position for again restoring said motor control means to said second condition.

2. A cassette loading apparatus for a front-loading video tape recorder according to claim 1; further comprising means for ejecting said cassette at least partly from said holding means during return movement of the latter along said substantially horizontal path portion in the course of said movement from said operative position to said insertion and ejection position whereby removal of said cassette from said holding means is facilitated.

3. A cassette loading apparatus for a front-loading video tape recorder according to claim 1; wherein said rack is on said holding means and is driven by said pinion which is rotated by said electric motor to move said holding means along said path portion.

4. A cassette loading apparatus for a front-loading video tape recorder according to claim 1; wherein said motor control means includes first lever means rockable on said support means between first and second positions corresponding to said first and second conditions, respectively, of said motor control means, and first bias means acting yieldably on said first lever means for urging the latter to said first position; said means responsive to insertion of the cassette into said holding means for actuating said motor control means includes second lever means rockable on said holding means between first and second positions and engageable with said first lever means when said holding means is in said insertion and ejection position, and second bias means relatively stronger than said first bias means and urging said second lever means to said second position of said second lever means, said second lever means, when in said second position thereof and engaged with said first lever means, being effective to displace said first lever means to said second position of the latter, and said second lever means being displaced to said first position thereof by a cassette inserted in said holding means in said insertion and ejection position, whereby to permit said first bias means to cause movement of said first lever means to said first position of the latter.

5. A cassette loading apparatus for a front-loading video tape recorder according to claim 4; wherein said means responsive to arrival of said holding means at said operative position for actuating said motor control means includes an actuating member fixed to said holding means and acting on said first lever means in said operative position of the holding means to move said first lever means to said second position of the latter.

6. A cassette loading apparatus for a front-loading video tape recorder according to claim 4; wherein said holding means includes frictional clamping means for resisting ejection of a cassette from said holding means by said second lever means under the urging of said second bias means; and said means responsive to said return movement of the holding means from said operative position to said insertion and ejection position includes abutment means fixed relative to said support means and engageable by said second lever means during movement of said holding means along said horizontal path portion toward said insertion and ejection position to rock said second lever means to said second position and eject the cassette from said holding means over the resistance of said frictional clamping means.

* * * * *